US00RE37469B1

(19) United States
(12) Reissued Patent
Toukura

(10) Patent Number: US RE37,469 E
(45) Date of Reissued Patent: Dec. 11, 2001

(54) CONTINUOUSLY VARIABLE TRANSMISSION CONTROL APPARATUS

(75) Inventor: Nobusuke Toukura, Yokosuka (JP)

(73) Assignee: Nissan Motor Co., Ltd., Yokohama (JP)

(21) Appl. No.: 09/567,194

(22) Filed: May 8, 2000

Related U.S. Patent Documents

Reissue of:
(64) Patent No.: 5,749,804
Issued: May 12, 1998
Appl. No.: 08/733,877
Filed: Oct. 18, 1996

(30) Foreign Application Priority Data

Oct. 20, 1995 (JP) ..... 7-272945

(51) Int. Cl.[7] ..... F16H 59/48
(52) U.S. Cl. ..... 477/47
(58) Field of Search ..... 477/47

(56) References Cited

U.S. PATENT DOCUMENTS 4,784,021 * 11/1988 Morimoto ..... 477/47
4,976,170 * 12/1990 Hayashi et al. ..... 477/47
5,586,953 * 12/1996 Abo ..... 477/47

FOREIGN PATENT DOCUMENTS 6-81932 * 3/1994 (JP) .

* cited by examiner

*Primary Examiner*—Dirk Wright
(74) *Attorney, Agent, or Firm*—Foley & Lardner

(57) ABSTRACT

An apparatus for controlling a continuously variable transmission for use with an automotive vehicle. The transmission is operable at a variable speed ratio for transmitting a drive from its input shaft to its output shaft. A target value for the speed of rotation of the input shaft of the transmission is calculated based on the sensed vehicle operating conditions including vehicle acceleration and vehicle speed. The target input shaft speed value is corrected to bring the vehicle acceleration into a predetermined range in the presence of the released accelerator pedal indicative signal. The speed ratio is controlled to bring the input shaft speed into coincidence with the corrected target input shaft speed value. The corrected target input shaft speed value is restricted below an upper limit set based on the vehicle speed.

9 Claims, 16 Drawing Sheets

CONTINUOUSLY VARIABLE TRANSMISSION CONTROL APPARATUS

Matter enclosed in heavy brackets [ ] appears in the original patent but forms no part of this reissue specification; matter printed in italics indicates the additions made by reissue.

BACKGROUND OF THE INVENTION

This invention relates to an apparatus for controlling a continuously variable transmission for use with an automotive vehicle to change the engine brake force when the vehicle is coasting with the accelerator pedal being released.

Some automotive vehicles employ a continuously variable transmission having an input shaft coupled to the engine and an output shaft coupled to the drive shaft for transmitting a drive from the engine to the drive shaft. Such a continuously variable transmission operates with a speed ratio controlled in a manner to bring the speed of rotation of the input shaft into coincidence with a target value calculated as a function of engine throttle position (or accelerator pedal position) and vehicle speed. It is the current practice to decrease the target input shaft speed value as the throttle position decreases. If the vehicle is coasting on a downhill slope, the operator will release the accelerator pedal. This causes the throttle position to decrease so that the target input shaft speed value is changed (decreased) in a direction to weaken the engine brake. As a result, the operator would feel an excessive degree of vehicle acceleration in spite of the fact that the accelerator pedal is released and increase the frequency at which the operator depresses the brake pedal.

For example, Japanese Patent Kokai No. 6-81932 discloses a continuously variable transmission control apparatus intended to reduce the frequency at which the operator depresses the brake pedal when the vehicle is coasting on a downhill slope by setting a great lower limit for the target input shaft speed value to perform aggressive operate engine brake operations. With such a conventional apparatus, however, the operator would feel a sense of incompatibility for the vehicle acceleration caused when the vehicle is coasting on a downhill slope if the vehicle speed comes out of a very narrow range, for example, 20 km/h or less. This is stemmed mainly from the fact that no upper limit has been set for the target input shaft speed.

Furthermore, some continuously variable transmissions are operable in a normal speed change mode (for example, D range) and also in a sport mode (for example, Ds range). In the sport mode, the target input shaft speed value is restricted below a lower limit greater than the limit set for the normal speed change mode to provide an increased engine brake force when the vehicle comes near one of the corners of a downhill slope. It is the current practice to make a change from the normal speed change mode to the sport mode with the use of an inhibitor switch associated with the shift lever. One of problem associated with such a conventional continuously variable transmissions is an engine brake force change against the operator's expectation. For example, the target input shaft speed value decreases to decrease the engine brake force in spite of the fact that the operator changes the speed change mode to the Ds range to obtain an increased engine brake force while the vehicle is coasting with the D range on a downhill slope having a great gradient. This a is stemmed from the fact that the conventional continuously variable transmission control includes no specified relationship between the upper limit set for the target input shaft speed values calculated for the vehicle coasting with the D range and the lower limit set for the target input shaft speed values calculated for the vehicle coasting with the Ds range.

SUMMARY OF THE INVENTION

It is a main object of the invention to provide an improved continuously variable transmission control apparatus which permits smooth vehicle coasting with minimized noise.

There is provided, in accordance with the invention, an apparatus for controlling a continuously variable transmission for use with an automotive vehicle including an accelerator pedal. The transmission has an input and output shaft. The transmission is operable at a variable speed ratio for transmitting a drive from the input shaft to the output shaft. The continuously variable transmission control apparatus comprises means for sensing vehicle operating conditions including vehicle acceleration and vehicle speed, means for producing a released accelerator pedal indicative signal when the accelerator pedal is released, means for calculating a target value for the speed of rotation of the input shaft based on the sensed vehicle operating conditions, means for correcting the target input shaft speed value to bring the vehicle acceleration into a predetermined range in the presence of the released accelerator pedal indicative signal, means for setting an upper limit for the target input shaft speed value based on the vehicle speed, means for limiting the corrected target input shaft speed value below the upper limit and means for controlling the speed ratio to bring the input shaft speed into coincidence with the corrected target input shaft speed value.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 1:
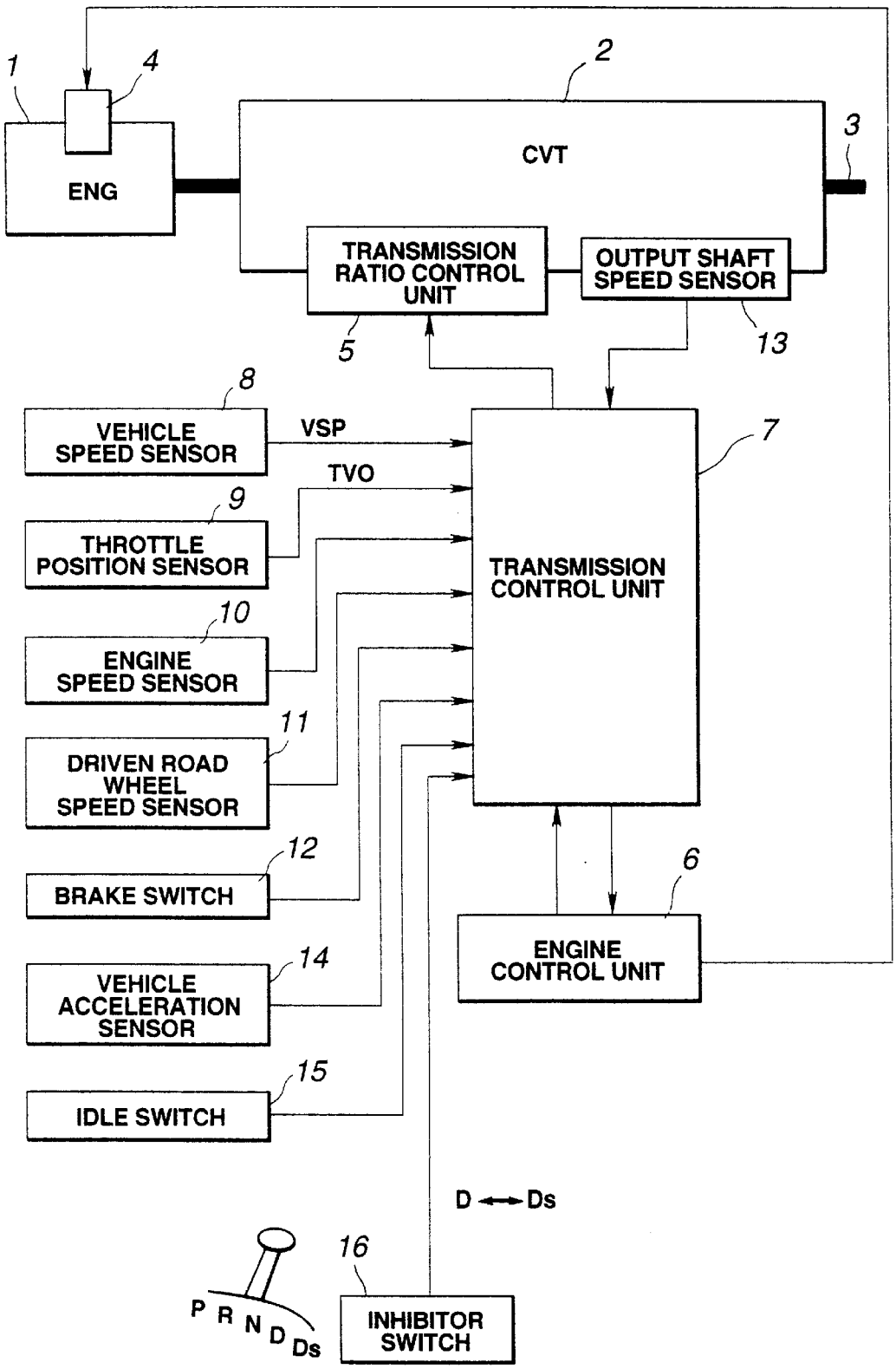
FIG. 1 is a block diagram showing one embodiment of a continuously variable transmission control apparatus made in accordance with the invention.

With reference to the drawings, and in particular to FIG. 1, there is shown a continuously variable transmission control apparatus for use with an automotive vehicle having an internal combustion engine 1. The engine 1 operates on command from an engine control unit 6 which control the amount of fuel metered to the engine 1, the fuel-injection timing and the ignition-system spark-timing. For example, the amount of fuel metered to the engine, this being determined by the width of the electrical pulses applied to the fuel injector 4, is repetitively determined from calculations performed in the engine control unit 6 based on various conditions of the engine that are sensed during its operation. These sensed conditions include cylinder-head coolant temperature, ambient temperature throttle position, engine load, engine speed, etc. The calculated value for the fuel-injection pulse-width is transferred to set the fuel injector 4 according to the calculated value therefor. A drive from the engine 1 is transmitted to a drive shaft 3 through a continuously variable transmission 2. The continuously variable transmission 2 has an input shaft coupled to an internal combustion engine 1 and an output shaft coupled to the drive shaft 3. The continuously variable transmission 2 may be of the V-belt or troidal type.

The continuously variable transmission 2 operates on command applied to a speed ratio control unit 5 from a transmission control unit 7. The transmission control unit 7 determines a target input shaft speed DSRREV repetitively from calculations performed therein based on various conditions of the automotive vehicle that are sensed during its operation. These sensed conditions include vehicle speed VSP, throttle position TVO, transmission input shaft speed Ni, driven road wheel speed, brake pedal position, transmission output shaft speed No. vehicle longitudinal acceleration G, accelerator pedal position and shift lever position. Thus, a vehicle speed sensor 8, a throttle position sensor 9, an engine speed sensor 10, a driven road wheel speed sensor 11, a brake switch 12, a transmission output shaft speed sensor 13, a vehicle acceleration sensor 14, an idle switch 15 and an inhibitor switch 16 are connected to the transmission control unit 7. The vehicle speed sensor is provided to sense the speed VSP of traveling of the automotive vehicle. The throttle position sensor 9 may be a potentiometer associated with the throttle valve situated in the induction passage of the engine and connected in a voltage divider circuit for supplying a voltage proportional to the degree TVO of opening of the throttle valve. The engine speed sensor 10 is provided for producing a pulse signal having a repetition rate proportional to the speed Ne of rotation of the engine. The driven road wheel speed sensor 11 is located for producing a pulse signal having a repetition rate proportional to the speed of rotation of the driven road wheels. The brake switch 12 is responsive to the application of braking to the automotive vehicle to close to supply current from the engine battery to the transmission control unit 7. The transmission output shaft speed sensor 13 is located for producing a pulse signal of a repetition rate proportional to the speed of rotation of the transmission output shaft. The vehicle acceleration sensor 14 is provided for producing a signal indicative of the longitudinal acceleration G of the automotive vehicle. The idle switch 15 closes to supply current from the engine battery to the transmission control unit 7 when he throttle position is at an angle less than a predetermined value, that is, the accelerator pedal is released. The inhibitor switch 16 is associated with the shift lever provided to select a desired one of speed change modes P, R, N, D and Ds of the transmission to make a selection between the drive (D range) and sport (Ds range) modes and it produces an electrical signal indicative of the selected speed change mode D or Ds. The continuously variable transmission is shown as having an input shaft directly coupled to the engine 1. In this case, the speed Ni of rotation of the transmission input shaft is equal to the engine speed Ne. It is to be understood, of course, that the transmission input shaft may be coupled to the engine 1 through a reduction gear unit or torque converter. In this case, another speed sensor is provided to produce a signal indicative of the speed Ni of rotation of the transmission input shaft. The transmission control unit 7 also communicates with the engine control unit 6 for synchronized engine and transmission control. The transmission control unit 7. The determined target input shaft speed DSRREV is converted into a corresponding target speed ratio DSRRFO (=Ni/No) which is transferred to the speed ratio control unit 5 to bring the input shaft speed Ni into coincidence with the target input shaft speed DSRREV.

The transmission control unit 7 may employ a digital computer which includes a central processing unit (CPU) a central processing unit (CPU), a read only memory (ROM), a random access memory (RAM) and an input/output interface unit (I/O). The central processing unit communicates with the rest of the computer. The input/output interface unit includes an analog-to-digital converter which receives analog signals from the throttle position sensor 9 and other sensors and converts them into digital form for application to the central processing unit. The input/output interface unit also includes counters which count the pulses fed thereto from the speed sensors 10, 11 and 13 and convert the counts into corresponding speed indication digital signals for application to the central processing unit. The read only memory contains the programs for operating the central processing unit and further contains appropriate data in look-up tables used in calculating appropriate values for the speed ratio control.

Figure 2:
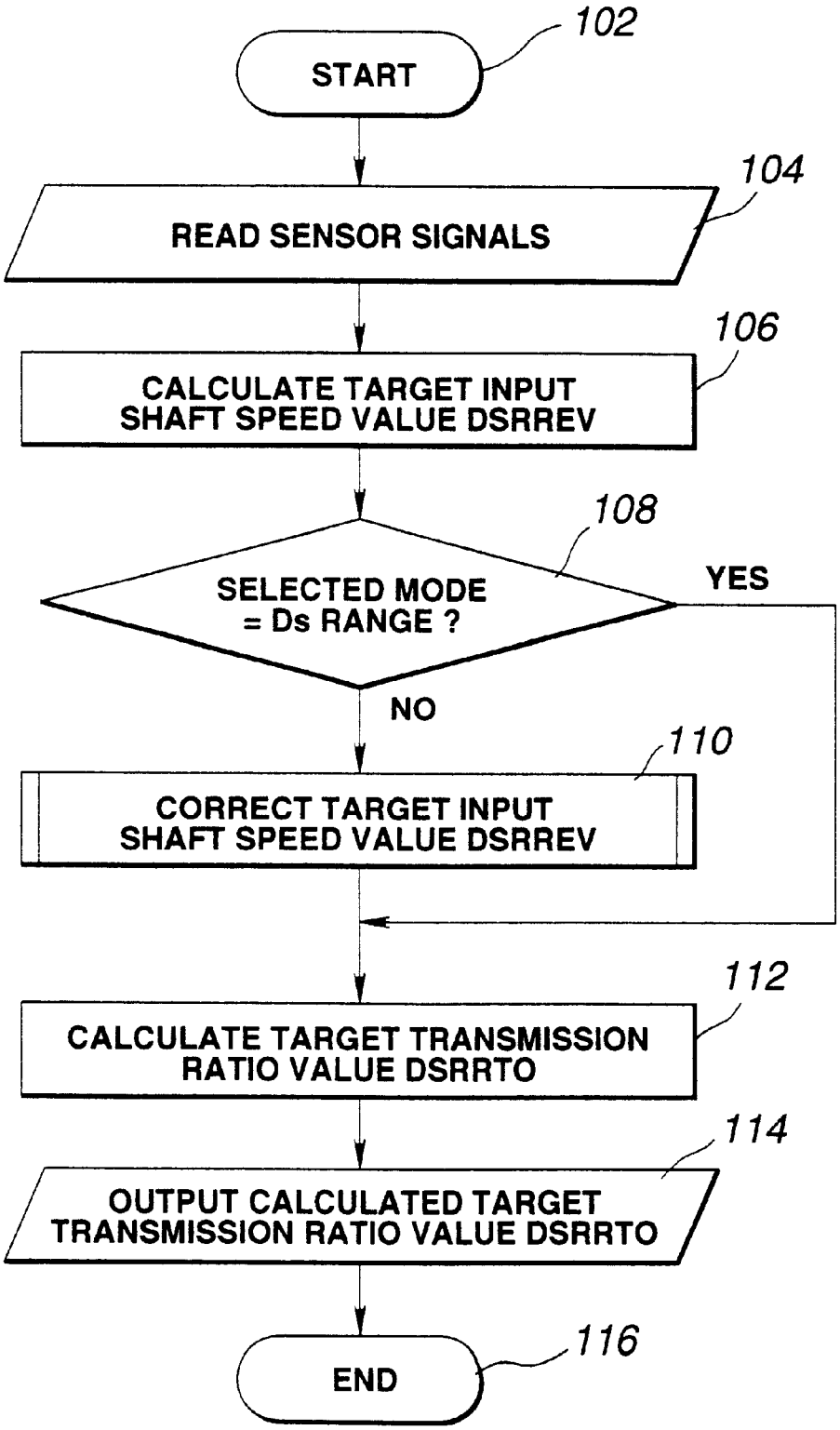
FIG. 2 is an overall flow diagram showing the operation of the digital computer used for the continuously variable transmission control.
Figure 12:
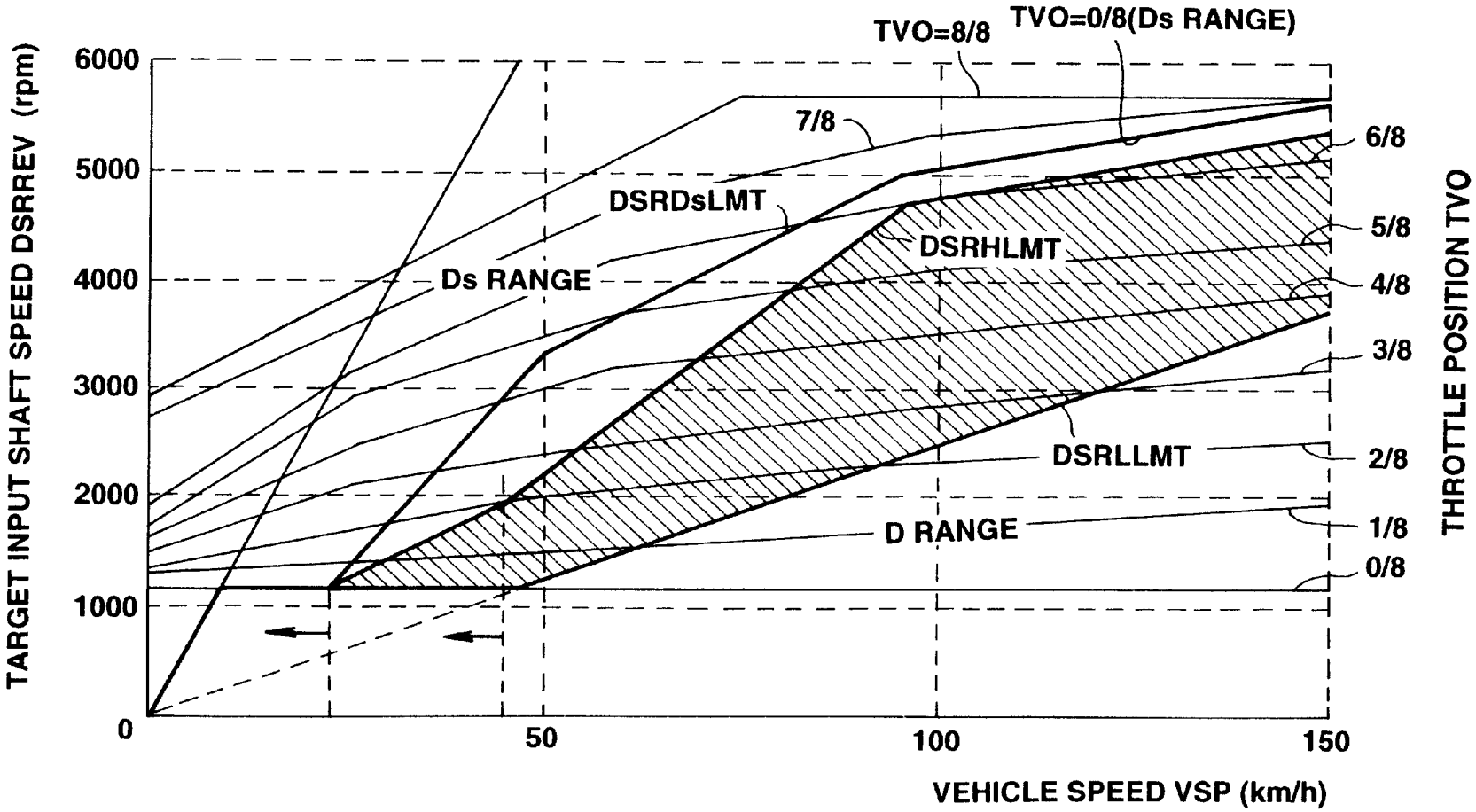
FIG. 12 is a graph of vehicle speed versus input shaft speed.

FIG. 2 is a flow diagram illustrating the programming of the digital computer as it is used to control the continuously variable transmission 2. The computer program is entered at the point 102 at uniform intervals of time, for example 5 msec. At the point 104 in the program, the sensor signals fed to the transmission control unit 7 from various sensors 8 to 16 are read into the computer memory. At the point 106, a target value DSRREV for the speed Ni of rotation of the transmission input shaft is calculated from a speed change map programmed into the computer. The speed change map defines the target input shaft speed DSRREV as a function of throttle position TVO and vehicle speed VSP, as shown in FIG. 12. At the point 108 in the program, a determination is made as to whether or not the sport mode (Ds range) is selected, by the inhibitor switch 16. This determination is made based on the output from the inhibitor switch 16. If the answer to this question is "yes", then it means that the correction of the calculated target input shaft speed value DSRREV for engine brake operation should be inhibited and the program jumps the point 110 to the point 112. Otherwise, it means that the normal speed change mode (D range) is selected and the program proceeds to the point 110. At the point no, the calculated target input shaft speed value DSRREV is corrected for engine brake operation. This correction is made based on the vehicle longitudinal acceleration G as described later in greater detail. At the point 112 in the program, a target speed ratio DSRRTO is calculated to bring the transmission input shaft speed Ni in coincidence with the corrected target value DSRREV. At the Point 114, the calculated target speed ratio value DSRRTO is transmission to the input/output interface unit which converts it into a corresponding control signal. This control signal is applied to the speed ratio control unit 5 which thereby operates the transmission 2 with a speed ratio corresponding to the calculated value DSRRTO.

Figure 3:
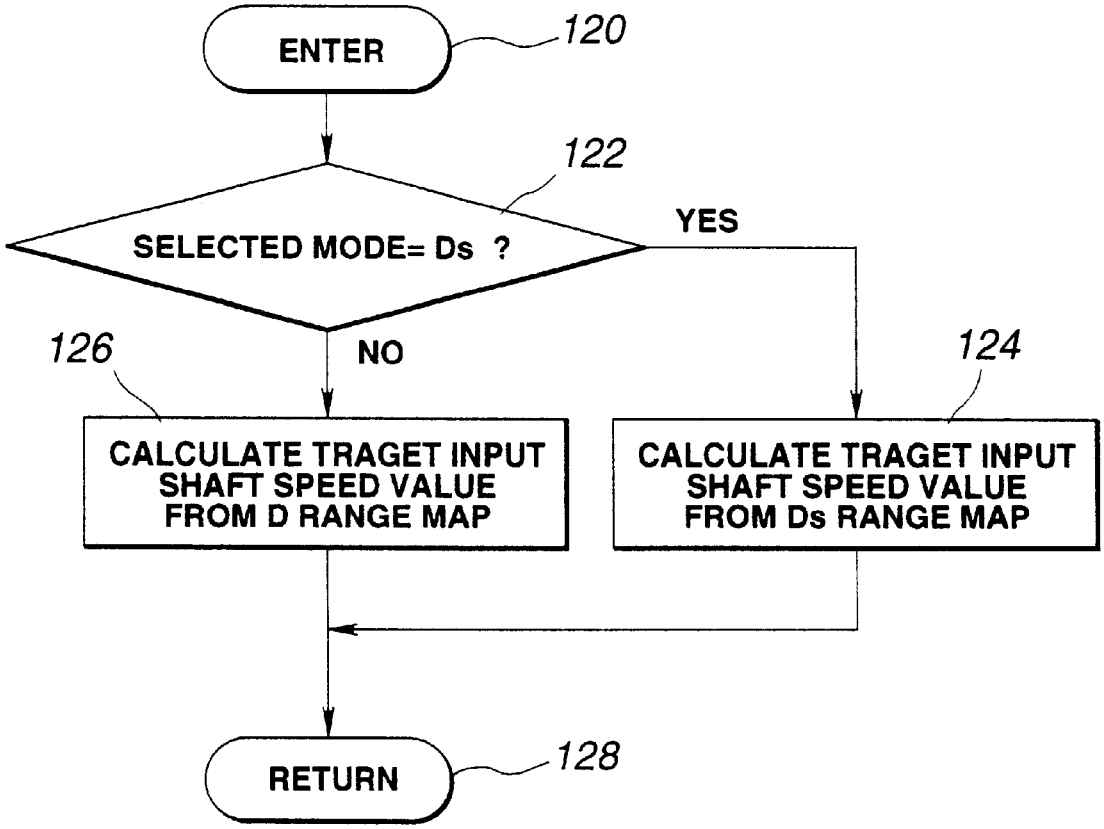
FIG. 3 is a detailed flow diagram showing the programming of the digital computer as it is used for the target input shaft speed calculation.

FIG. 3 is a now diagram illustrating the above calculation of the target value DSRREV for the speed Ni of rotation of the transmission input shaft. At the point 120, which corresponds to the point 106 of FIG. 2, the computer program is entered. At the point 122 in the program, a determination is made as to whether or not the output of the inhibitor switch 16 indicates the selection of the sport mode (Ds range). If the answer to this question is "yes", then the program proceeds to the point 124 where the target input shaft speed DSRREV is calculated from a Ds range map which defines the target input shaft speed DSRREV as a function of vehicle speed VSP and throttle valve position TVO, as shown in FIG. 12. This Ds range map is shown as specifying the target input shaft speed DSRREV in a range defined by a lower limit DSRDsLMT and an upper limit specified by the full-open throttle position (TVO=8/8). Upon the completion of this calculation, the program proceeds to the point 128 where the program returns to the entry point 120. If the answer to the question inputted at the point 122 is "no", then the program proceeds to the point 126 where the target input shaft speed DSRREV is calculated from a D range map which defines the target input shaft speed DSRREV as a function of vehicle speed VSP and throttle position TVO, as shown in FIG. 12. This D range map is shown as specifying the target input shaft speed DSRREV in a range defined by lower and upper limits DSRLLMT and DSRHLMT. Upon the completion of this calculation, the program proceeds to the point 128 where the program returns to the entry point 120.

Figure 4:
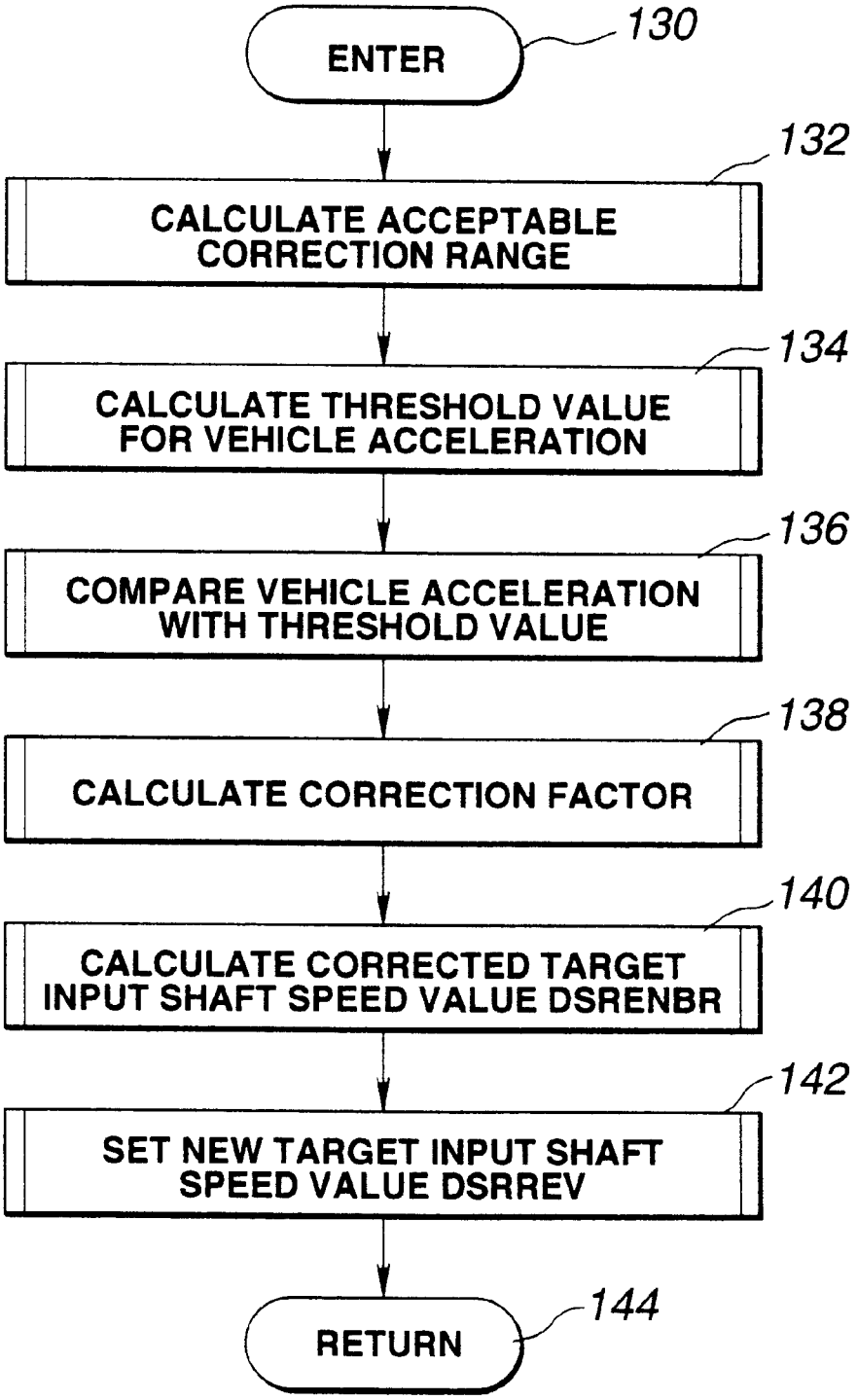
FIG. 4 is a detailed flow diagram showing the programming of the digital computer as it is used for target input shaft speed calculation.

FIG. 4 is a flow diagram illustrating the above correction of the target transmission input shaft speed value DSRREV. At the point 130 in FIG. 4, which corresponds to the point 110 of FIG. 2, the computer program is entered. At the point 132, an acceptable correction range where the speed Ni of the input shaft of the continuously variable transmission 2 can be corrected is determined based on the target input shaft speed DSRREV calculated at the point 106 of FIG. 2. At the point 134, a threshold value of the vehicle longitudinal acceleration G is calculated. At the point 136, the vehicle acceleration G is compared with the calculated threshold value for a determination as to whether or not a stronger or weaker engine brake is required. At the point 138, the rate of change of the engine brake force, that is, a correction factor by which the target input shaft speed is to be corrected per unit time, is calculated according to the vehicle longitudinal acceleration G. At the point 140, the correction factor calculated at the point 138 is used to correct the target input shaft speed DSRREV so as to produce an engine brake force corresponding to the vehicle longitudinal acceleration. At the point 142, the corrected target input shaft speed DSRENBR is set as a new target input shaft speed DSRREV. The new target input shaft speed DSRREV is outputted to calculate a target speed ratio DSRRTO. Following this, the program proceeds to the point 144 where the program returns to the entry point 130.

Figure 13:
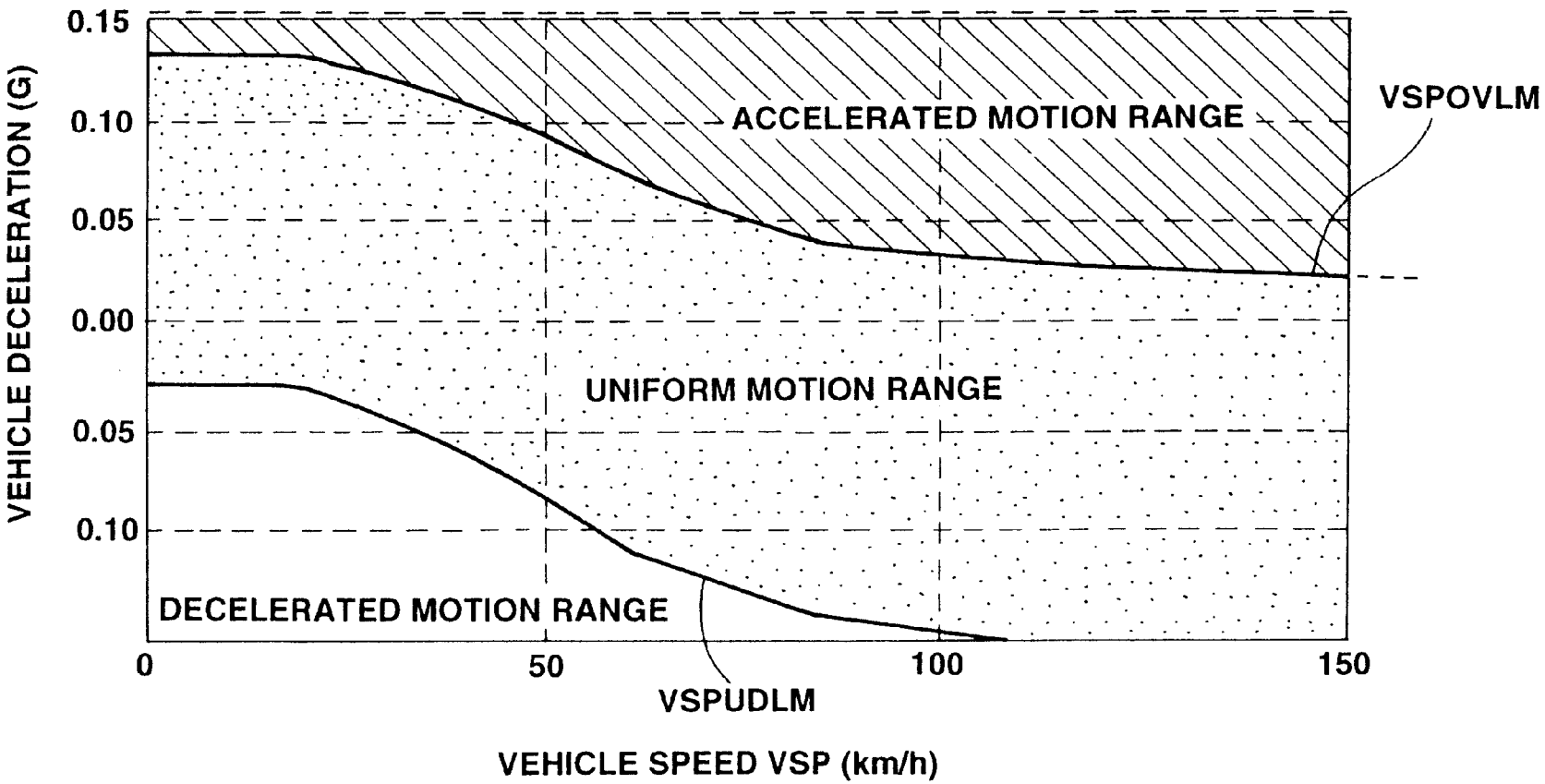
FIG. 13 is a graph of vehicle speed versus vehicle acceleration.
Figure 14:
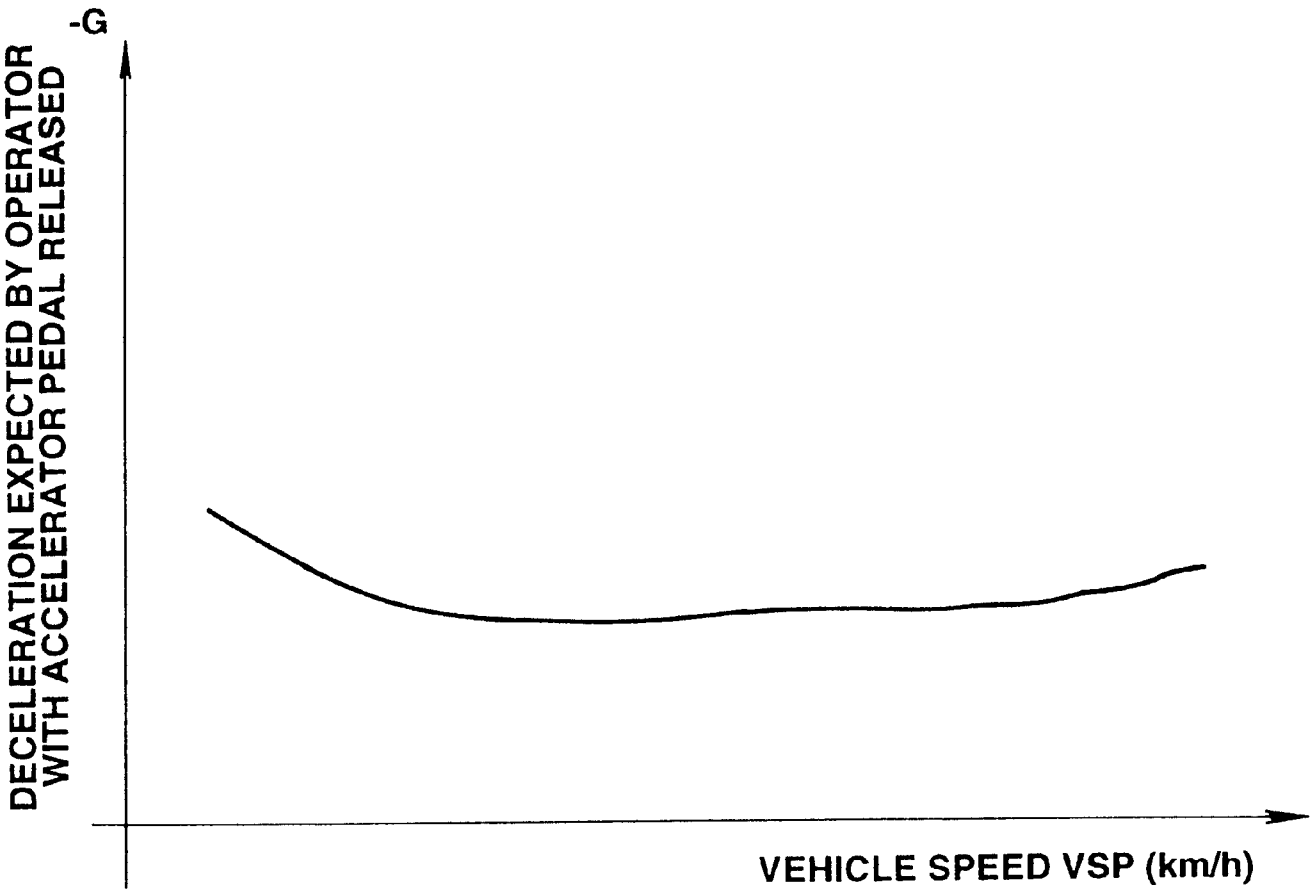
FIG. 14 is a graph of vehicle speed versus operator's expected deceleration.

Referring to FIGS. 5 to 11, the details of the above correction of the target transmission input shaft speed value DSRREV will be described. At the point 150 in FIG. 4, which corresponds to the point 132 of FIG. 4, the computer program is entered. At the, Point 152 in the program the upper limit DSRHLMT of the acceptable correction range for the input shaft speed Ni is calculated from the map of FIG. 12 which defines the upper limit DSRHLMT as a function of vehicle speed VSP. At the point 154, the lower limit DSRLLMT of the acceptable correction range for the input shaft speed Ni is calculated from the map of FIG. 12 which defines the lower limit DSRLLMT as a function of vehicle speed VSP. At the point 156, an acceleration side threshold value VSPOVLM is calculated from a map programmed into the computer. This MP defines the acceleration side threshold value VSPOVIM as a function of vehicle speed VSP, as shown in FIG. 13. At the point 158, a deceleration side threshold value VSPUDLM is calculated from the map of FIG. 13. The map may be obtained experimentally from accelerations the operator expects when the accelerator pedal is released, this being detected when the idle switch 15 is turned on. The operator bodily senses vehicle acceleration in an accelerated motion range (AMR) defined above the acceleration side threshold value VSPOVLM and vehicle deceleration in a decelerated motion range (DMR) defined below the deceleration side threshold value VSPUDLM. It has been discovered through experiments that the degree of deceleration the operator expects when the accelerator pedal is released remains about 0.06G (acceleration=−0.06G) and it is almost independent on the vehicle speed VSP, as shown in FIG. 14. If the deceleration is set at 0.06G regardless of vehicle speed, however, the operator will bodily sense a stronger engine brake force at certain low vehicle speeds and an insufficient engine brake force at certain high vehicle speeds. For this reason, it is desirable to change the target deceleration according to the operator's bodily sensation of the deceleration. That is, at certain low vehicle speeds; the target deceleration is reduced below 0.06G. At certain high vehicle speeds, the rate of change of the deceleration is increased to change the engine brake force continuously to bring the vehicle acceleration into the uniform motion range (FIG. 13) with the accelerator pedal being depressed.

Figure 5:
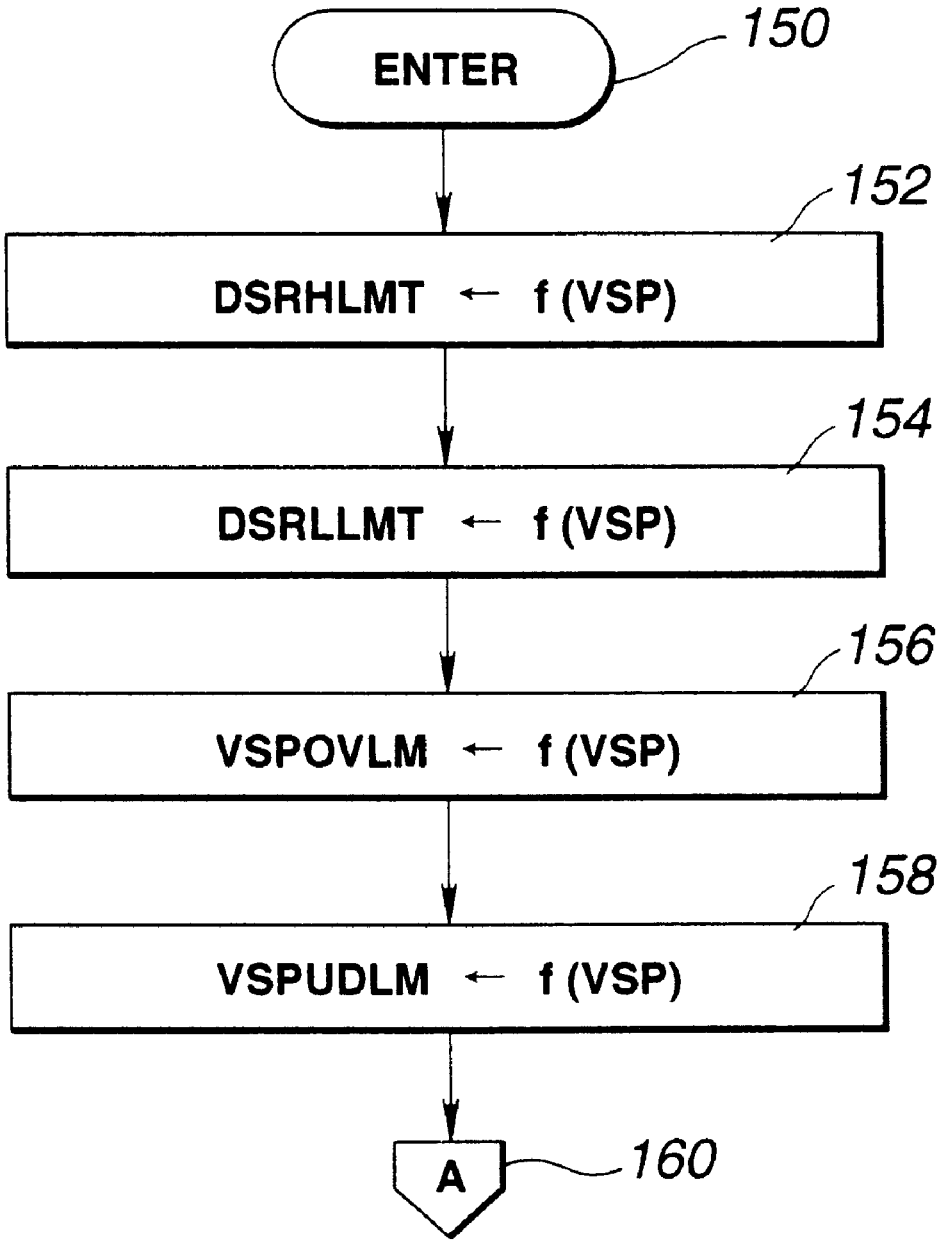
FIGS. 5 to 11 are detailed flow diagrams showing the programming of the digital computer as it is used for target input shaft speed calculation.
Figure 6:
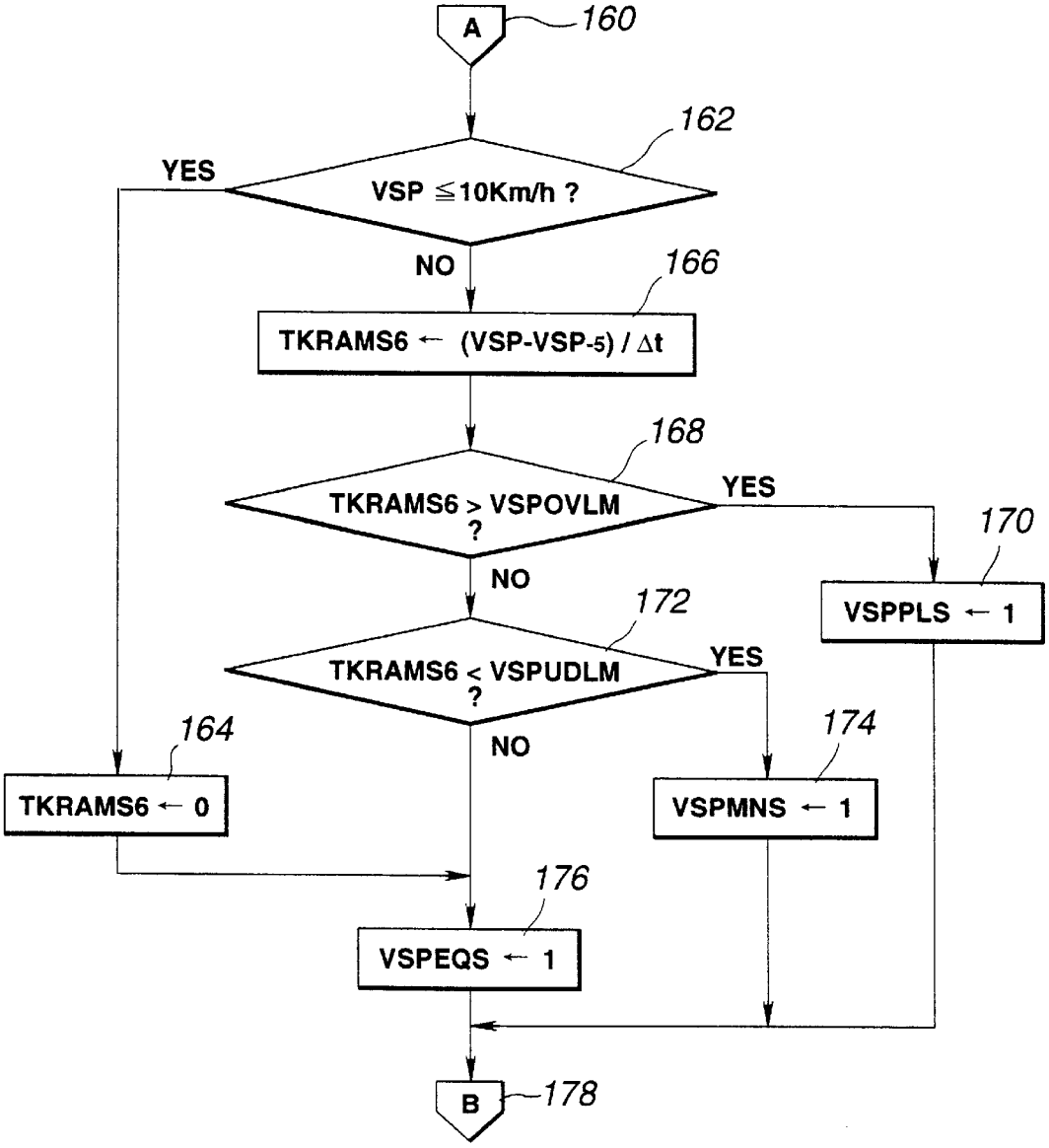

Upon completion of the step at the point 158 in the program of FIG. 4, the program proceeds to the point 160 of FIG. 6 which corresponds to the point 136 of FIG. 4. At the point 162, a determination is made as to whether or not the vehicle speed VSP is equal to or less than a predetermined value, for example, 10 Km/h. If the answer to this question is "yes", then it means that the vehicle speed is in a predetermined low speed range and the program proceeds to the point 164 where the vehicle acceleration TKRAMS6 is set at 0 and then to the point 176. Otherwise, the program proceeds to the point 166 where the vehicle acceleration (or deceleration) TKRAMS6 is calculated based on the difference between the vehicle speed VSP read in this cycle of execution of this program and the vehicle speed $VSP_{-5}$ read before a predetermined number of (in this case 5) cycles of execution of this program. Although the vehicle acceleration TKRAMS6 is calculated as the rate of change of the vehicle speed VSP, it is to be understood of course, that it may be the sensed value of the vehicle acceleration sensor 14. At the point 168, a determination is made as to whether or not the vehicle acceleration TKRAMS6 is greater than the acceleration side threshold value VSPOVLM calculated at the point 156 of FIG. 5. If the answer to this question is "yes", then the program proceeds to the point 170 where an accelerated motion flag VSPPLS is set to indicate that the vehicle acceleration is in the accelerated motion range so that a stronger engine brake is required and then to the point 178. Otherwise the program proceeds to another determination step at the point 172. This determination is as to whether or not the vehicle acceleration TKRAMS6 is smaller than the deceleration side threshold value VSPUDLM calculated at the point 148 of FIG. 4. If the answer to this question is "yes", then the program proceeds to the point 174 where a decelerated motion flag VSPMNS is set to indicate that the vehicle acceleration is in the decelerated motion range requiring a weaker engine brake force and then to the point 178. Otherwise, the program proceed, to the point 176 where a uniform motion flag VSPEOS is set to indicate that the vehicle acceleration is in the uniform motion range so that the existing engine brake is to be retained.

Figure 7:
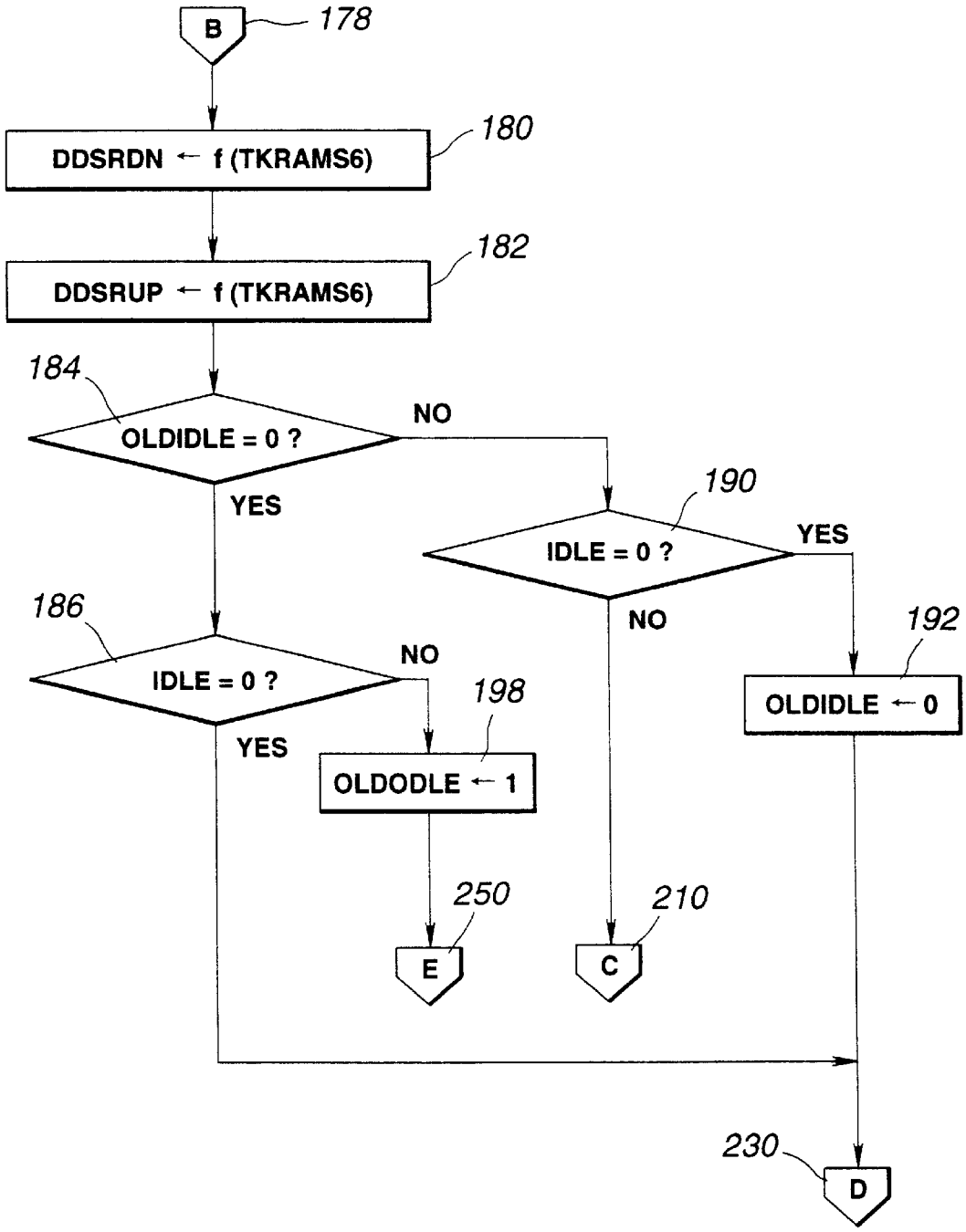
Figure 15:
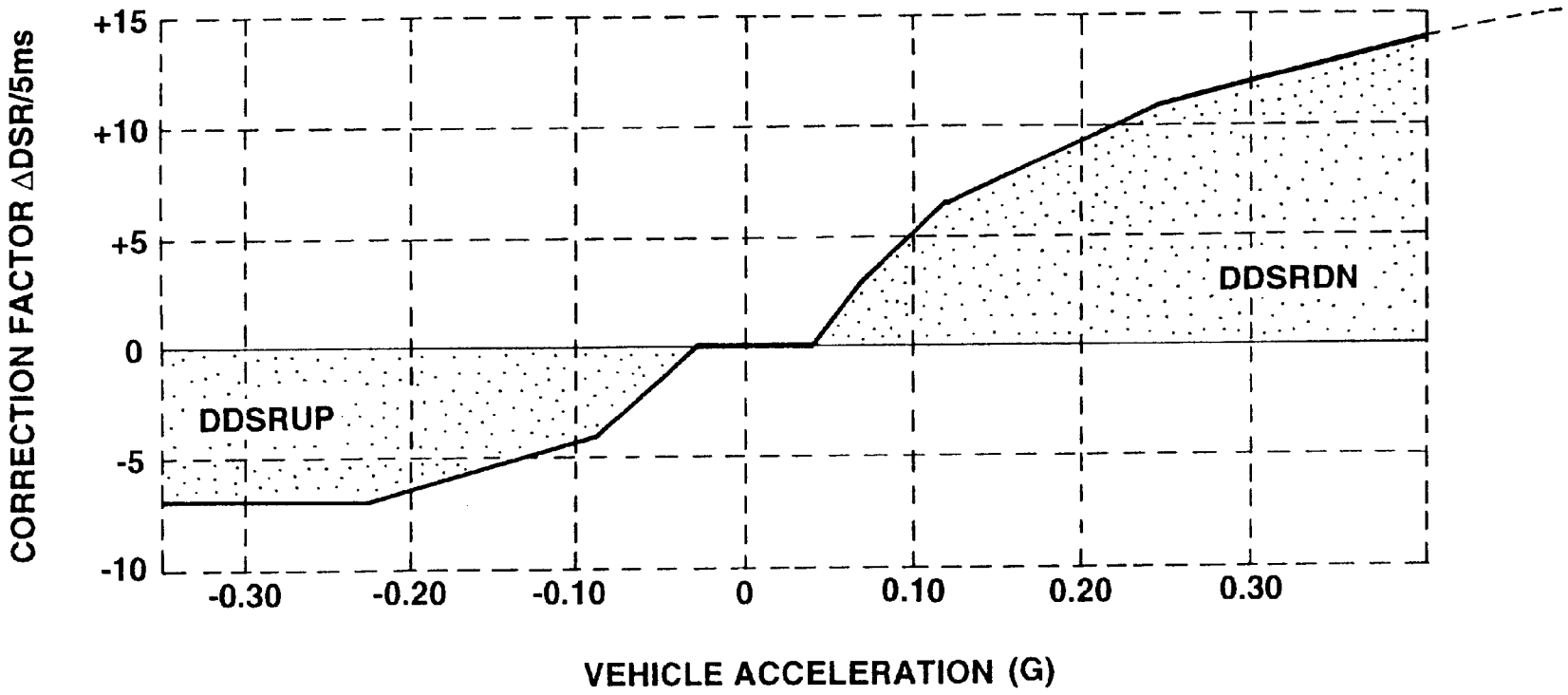
FIG. 15 is a graph of vehicle acceleration versus input shaft speed correction factor.

Following this, the program proceeds to the point 178 of FIG. 7 which corresponds to the point 138 of FIG. 4. At the points 180 and 182 in the program a down- or up-shift correction factor DDSRDN or DDSRUP by which the target input shaft speed DSRREV is to be corrected per unit time is calculated from a map programmed into the computer. This map specifies this correction factor DDSRDN or DDSRUP as a function of vehicle acceleration TKRAMS6, as shown in FIG. 15. This map may be obtained experimentally, as described later. The downshift correction factor DDSRDN is calculated in a direction to increase the target input shaft speed value DSRREV so as to increase the engine brake force when the vehicle acceleration TKRAMS6 has a positive sign and the up-shift correction factor DDSRUP is calculated in a direction to decrease the target input shaft speed value DSRREV so as to decrease the engine brake force when the vehicle acceleration TERAMS6 has a negative sign. In the illustrated case, the unit time corresponds to the time interval (5 msec) of execution of this program.

At the point 184 in the program, a determination is made as to whether or not a flag OLDIDLR, which was set to 1 if the idle switch 15 is off in the last cycle of execution of this program is 0. If the answer to this question is "yes", then the accelerator pedal was depressed and the program proceeds to another determination step at the point 186. This determination is as to whether or not a flag IDLE which has been set to 1 if the idle switch 15 is off in the present cycle of execution of this program is 0. If the answer to this question is "yes", then it means that the accelerator pedal remains depressed and the program proceeds to the point 230 of FIG. 9. Otherwise, it means that the accelerator pedal is released from its depressed position and the program proceeds to the point 188 where the flag OLDIDLE is set to 1 and then the program proceeds to the point 250 of FIG. 10.

If the answer to the question inputted at the point 184 is "no", then it means that the accelerator pedal was released and the program proceeds to another determination step at the point 190. This determination is as to whether or not the flag IDLE is 0. If the answer to this question is "no", then it means that the accelerator pedal remains released and the program proceeds to the point 210 of FIG. 8. Otherwise, it means that the accelerator pedal is depressed from its released position and the program proceeds to the point 192 where the flag OLDIDLE is cleared to 0 and then to the point 230 of FIG. 9.

Figure 8:
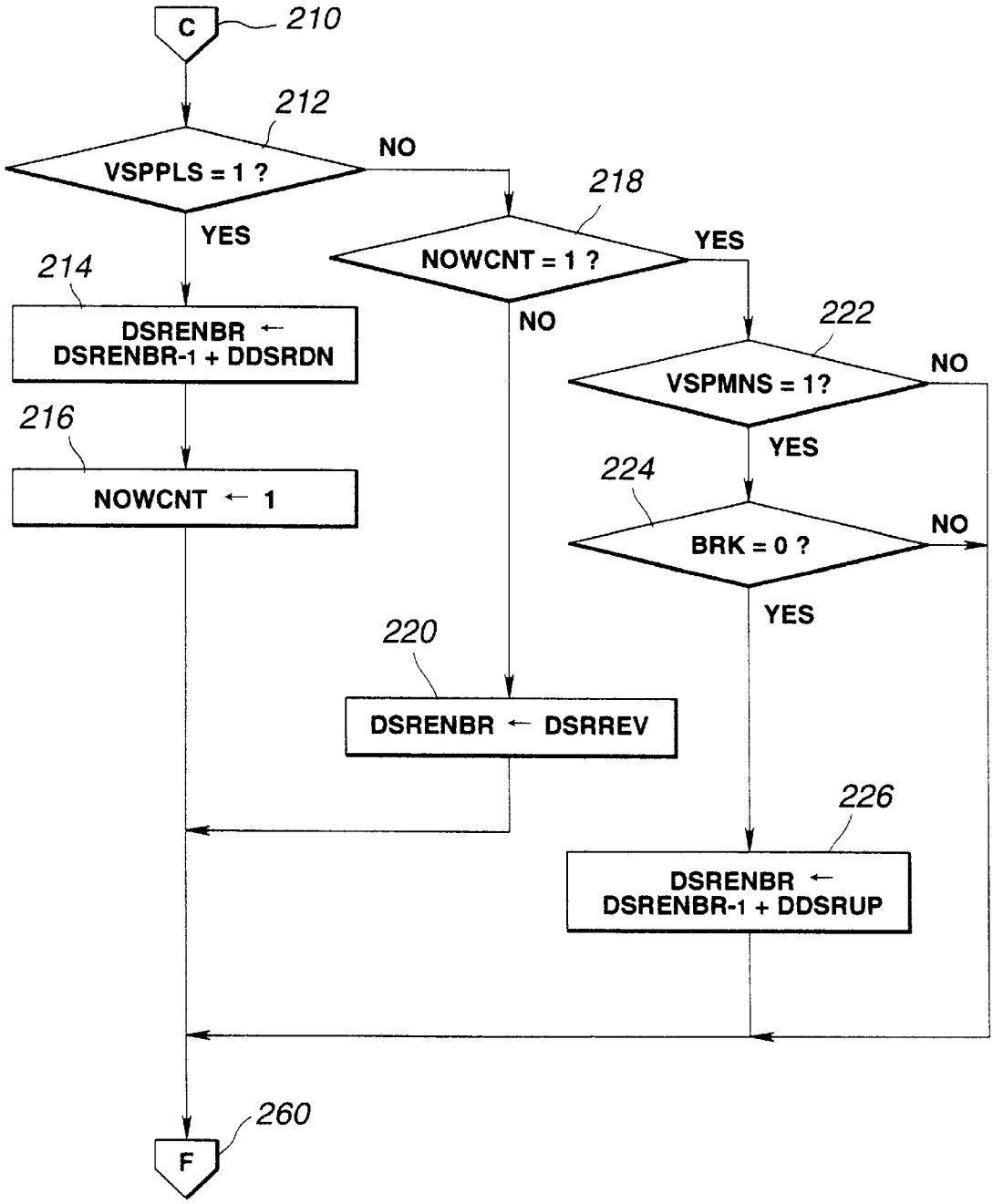

FIG. 8 is a flow diagram illustrating the correction of the target input shaft speed value DSRREV when the accelerator pedal remains released. At the point 212 in the program, a determination is made as to whether or not the accelerated motion flag VSPPLS (FIG. 6) has been set at 1. If the answer to this question is "yes", then it means that the vehicle acceleration is in the accelerated motion range (FIG. 13) and the program proceeds to the point 214 where the central processing unit increase the target input shaft speed value DSRREV by adding the downshift correction factor DDSRDN calculated at the Point 180 of FIG. 7 to the last corrected target input shaft speed value DSRENBR ($DSRENBR=DSRENBR_{-1}+DDSRDN$ where $DSRENBR_{-1}$ is the corrected target input shaft speed value obtained in the last cycle of execution of this program) in order to increase the engine brake force so as to bring the vehicle acceleration from the accelerated motion range into the uniform motion range. At the point 216, a correction flag NOWCNT is set at 1 to indicate that the target input shaft speed value DSRREV is being corrected. Following this, the program proceed to the point 260 of FIG. 11.

If the answer to the question inputted at the point 212 is "no", then the prop=proceeds to another determination step at the point 218. This determination is as to whether or not the correction flag NOWCNT has been set. If the answer to this question is "no", then it means that no correction is required for the target input shaft speed value DSRREV and the program proceeds to the point 220 where the target input shaft speed value DSRREV calculated at the point 106 of FIG. 2 is set for the 10 corrected target input shaft speed value DSRENBR.

Figure 11:
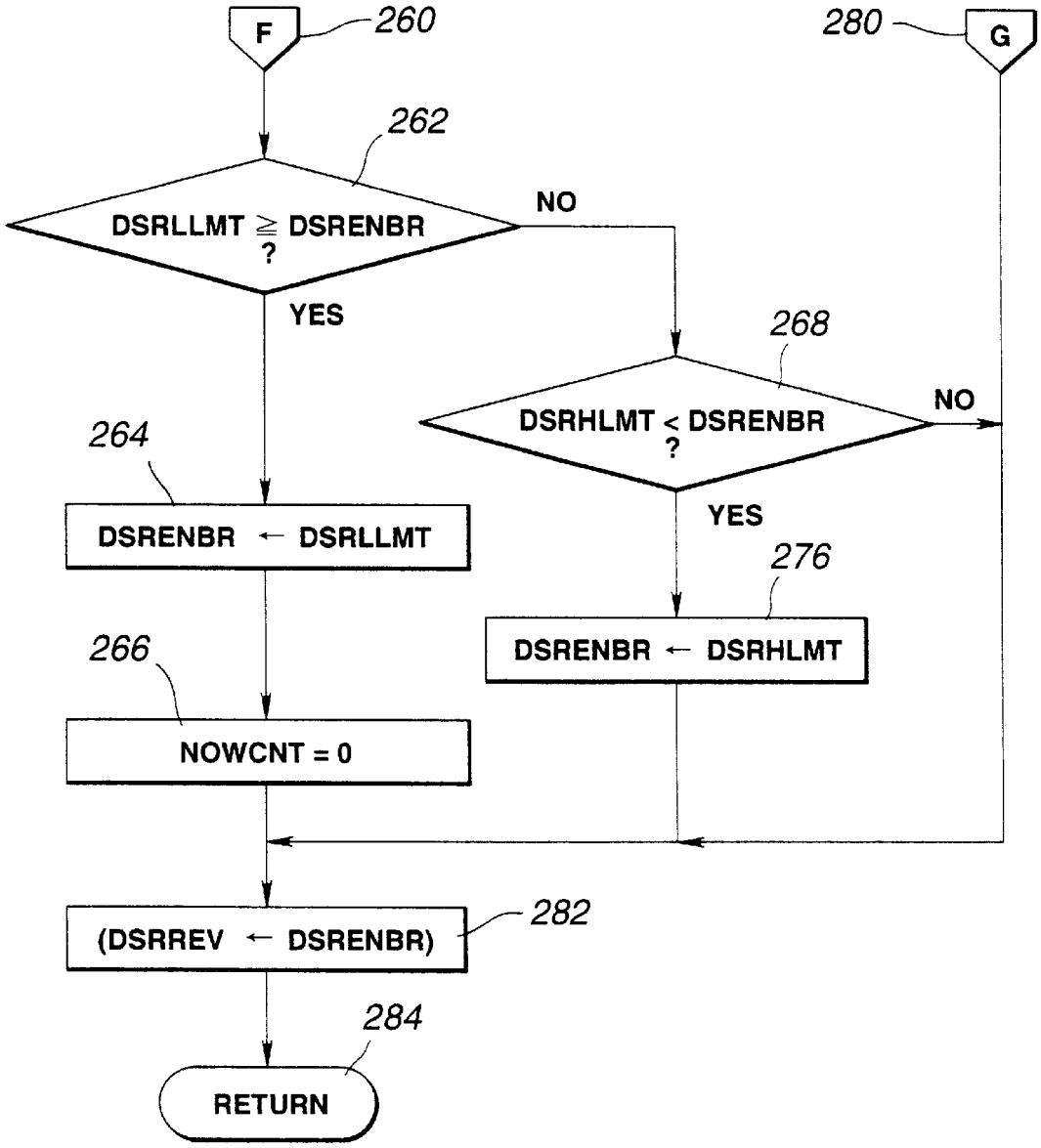

Following this, the program proceeds to the point 260 of FIG. 11.

If the answer to the question inputted at the point 218 is "no", then the program proceeds to another determination step at the point 222. This determination is as to whether or not the decelerated motion flag VSPMNS (FIG. 6) has been set. If the answer to this question is "yes", then it means that the vehicle acceleration is in the decelerated motion range and the program proceeds to the point 224. Otherwise, the program proceeds to the point 260 of FIG. 11. At the point 224, a determination is made as to whether or not the brake pedal is released. This determination is made based on the signal BRK fed from the brake switch 12. If the answer to this question is "yes" (BRK=0), then the program proceeds to the point 226 where the central processing unit decreases the target input shaft speed value DSRREV gradually by adding the up-shift correction factor DDSRUP (negative value) calculated at the point 182 of FIG. 7 to the last corrected target input shaft speed value DSRENBR ($DSRENBR=DSRENBR_{-1}+DDSRUP$ where $DSRENBR_{-1}$ is the corrected target input shaft speed value DSRENBR obtained in the last cycle of execution of this program). Following this, the program proceeds to the point 260 of FIG. 11. If the answer to the question inputted at the point 224 is "no", then the program proceeds to the point 260 of FIG. 11. That is, the operator's braking operation is given top priority by preventing the target input shaft speed value DSRREV from being corrected to a smaller value even though the vehicle acceleration is in the decelerated motion range where the engine brake should be weakened.

Figure 9:
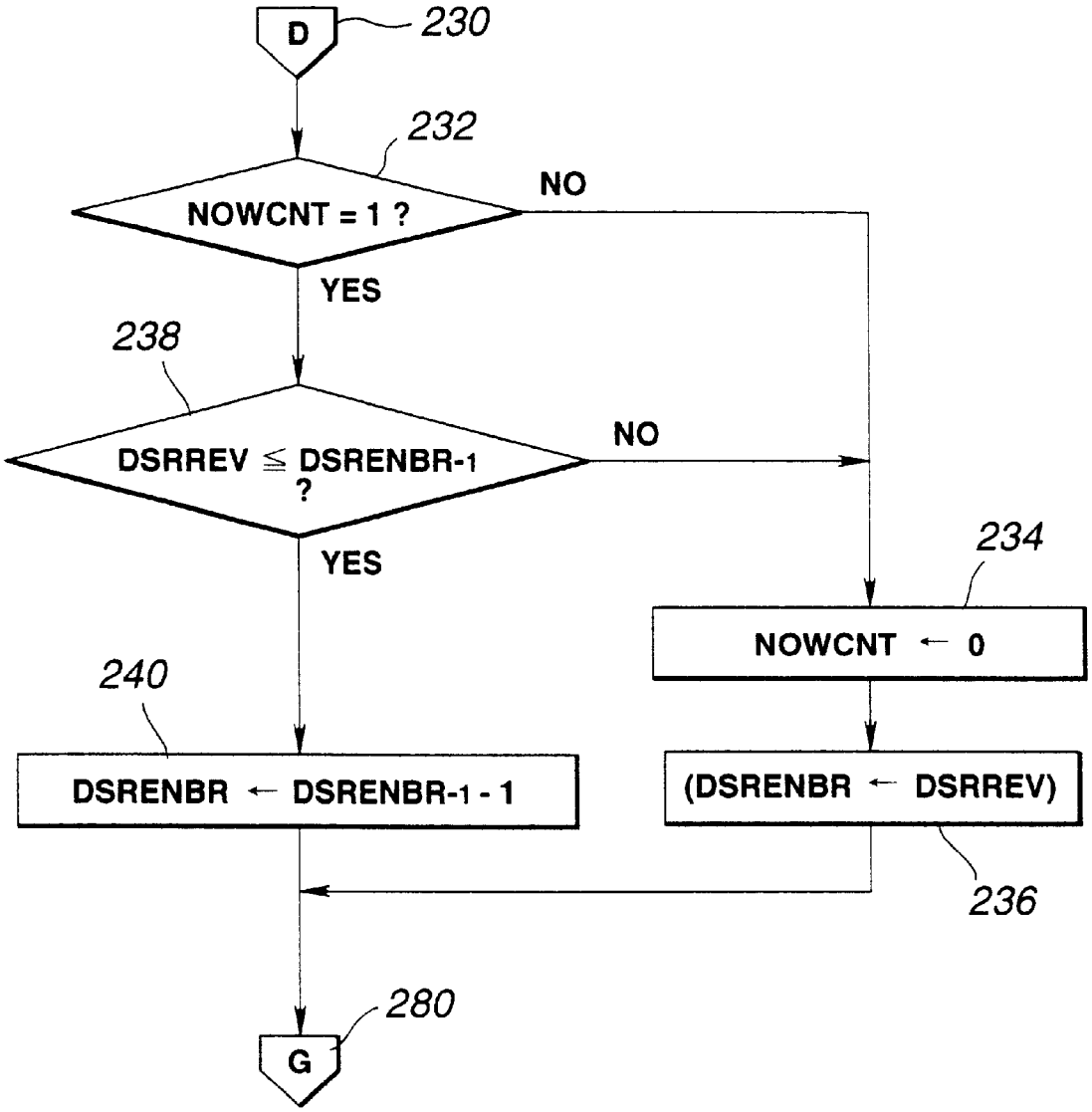

FIG. 9 is a How diagram illustrating the correction of the target input shaft speed value DSRREV when the accelerator pedal is depressed or remains depressed. At the Point 232 in the program, a determination is made as to whether or not the correction flag NOWCNT has been set at 1. If the answer to this question is "yes", then it means that the target input shaft speed value DSRREV is being corrected and the program proceeds to the point 238. Otherwise, the program proceeds to the point 234 where the correction flag NOWCNT is cleared to 0 and then to the point 236 where the target input shaft speed value DSRREV calculated at the point 106 of FIG. 2 is set for the corrected target input shaft speed value DSRENBR. Following this, the program proceeds to the point 280 of FIG. 11.

At the point 238 in the program, a determination is made as to whether or not the target input shaft speed value DSRREV calculated at the point 106 of FIG. 2 is equal to or less than the corrected target input shaft speed value $DSRENBR_{-1}$ obtained in the last cycle of execution of this program If the answer to this question is "yes", then the program proceeds to the point 230, otherwise, the program proceeds to the Point 234. At the Point 240, the corrected target input shaft speed value DSRENBR is calculated by subtracting a predetermined value (in the illustrated case 1 rmp) from the last corrected target input shaft speed value $DSRENBR_{-1}$ ($DSRENBR=DSRENBR_{-1}-1$). Following this, the program Proceeds to the point 280 of FIG. 11.

Figure 10:
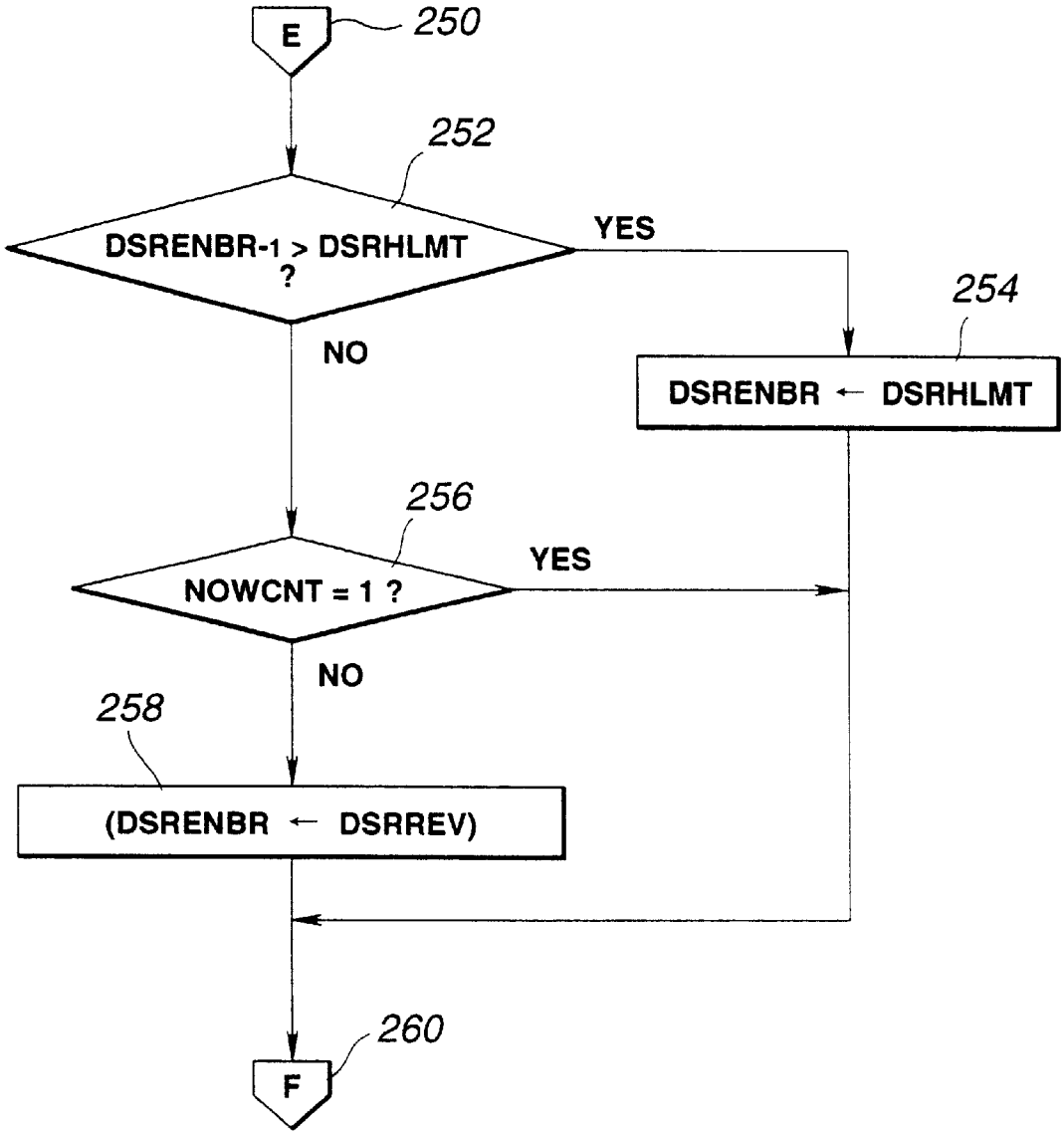

FIG. 10 is a flow diagram illustrating the correction of the target input shaft speed value DSRREV when the accelerator pedal is released. At the point 252 in the program, a determination Is made as to whether of not the last corrected target input shaft speed value $DSRENBR_{-1}$ is greater than the upper limit DSRHLMT for the input shaft speed calculated at the point 152 of FIG. 5. If the answer to this question is "yes", then the program proceeds to the point 254 where the upper limit DSRHLMT is set for the corrected target input shaft speed DSRENBR and then to the point 260 of FIG. 11. Otherwise, the program proceeds to another determination step at the point 256. This determination is as to whether or not the correction flag NOWCNT has been set at 1. If the answer to this question is "yes", then it means that the target input shaft speed value DSRREV is being corrected and the program proceeds to the point 260 of FIG. 11. Otherwise, the program proceeds to the point 258 where the target input shaft speed value DSRREV calculated at the point 106 of FIG. 2 is set for the corrected target input shaft speed value DSRENBR. Following this, the program proceeds to the point 260 of FIG. 11.

At the point 262 in the program of FIG. 11, a determination is made as to whether or not the corrected target input shaft speed value DSRENBR is equal to or less than the lower limit DSRLLMT calculated at the point 154 of FIG. 5. If the answer to this question is "yes", then the program proceeds to the point 264 where the lower limit DSRLLMT is set for the corrected target input shaft speed value DSRENBR. At the point 266, the correction flag is cleared to zero. Following this, the program proceeds to the point 282.

If the answer to the question inputted at the point 262 is "no", then the program proceeds to another determination step at the point 268. This determination is as to whether or not the corrected target input shaft speed value DSRENBR is greater than the upper limit DSRHLMT calculated at the point 152 of FIG. 5. If the answer to this question is "Yes", then the program proceeds to the point 276. Otherwise, the program proceeds to the point 282. At the point 276, the upper limit DSRHLMT is set for the corrected target input shaft speed value DSRENBR. Upon completion of the step at the point 276, the program proceeds to the point 282. The program proceeds from the point 280 to the point 282.

At the point 282, the corrected target input shaft speed value DSRENBR is set for the new target input shaft speed value DSRREV. Following this, the program proceeds to the point 284 where the program returns to the entry point 102 of FIG. 2. The calculated new target input shaft speed value DSRREV is transferred to the input/output interface unit which converts it into a corresponding target speed ratio and produces a control signal causing the speed ratio control unit 5 to set the continuously variable transmission 2 according to the target speed ratio.

The Speed change map programmed into the computer as shown in FIG. 12, includes look-up data used to calculate the target input shaft speed for two kinds of speed change modes (D and Ds ranges). For the sport mode (Ds range), where an increased engine brake or drive force is required for down or up-hill driving, the target input shaft speed DSRREV is restricted above the limit DSRDsLMT to retain high engine speeds.

When the Vehicle is coasting on a downhill slope with the accelerator pedal being released, the target input shaft speed DSRREV is corrected between the upper and lower limits DSRHLMT and DSRLLMT to provide an appropriate engine brake force according to the operator's expectation and also to converge the vehicle acceleration into the uniform motion range (FIG. 13). The lower limit DSRLLMT increases as the vehicle speed VSP increases. This is effective to realize rapid engine brake application at high vehicle speeds. The upper limit DSRHLMT increases as the vehicle speed VSP increases. For example, the upper limit DSRHLMT is set at a small value (for example 2000 rpm or less) when the vehicle speed VSP is less than a predetermined small value (for example, 40 km/h) and at a predetermined vary small value (for example, 1200 rpm) which is equal to the lower limit DSRLLMT when the vehicle speed VSP is a predetermined very small value (for example, 20 km/h).

Figure 16:
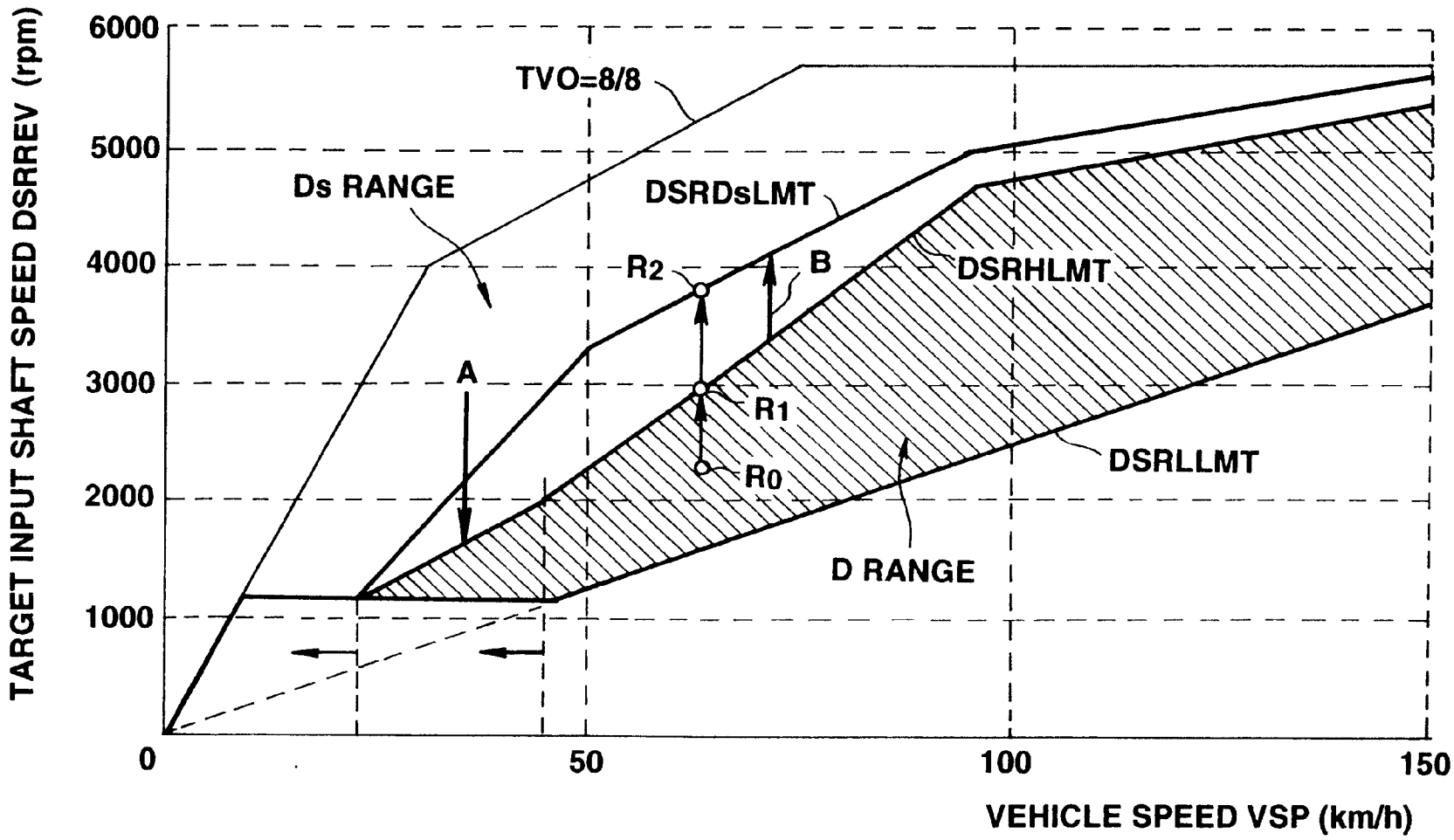
FIG. 16 is a graph used in explaining the operation of the continuously variable transmission control apparatus of the invention when the vehicle is coasting on a downhill slope.

If the vehicle speed is in such a low vehicle speed range (for example, between 40 to 20 km/h) the operator would not feel a sense of incompatibility for somewhat vehicle acceleration when the vehicle is coasting on a downhill slope with the accelerator pedal being released. Since it is not required to provide a feel of vehicle deceleration, it is preferable to suppress noises resulting from an excessive engine speed increase by setting the lower limit DSRHLMT at a small value. According to the invention, it is possible to avoid excessive engine brake application and also suppress excessive engine speed increase by setting the upper limit DSRHLMT at a smaller value, as indicated by the arrow A of FIG. 16. This is effective to realize smooth vehicle coasting according to the operator's expectation merely by releasing the brake pedal regardless of the gradient of the slope. When the vehicle speed is above the low vehicle speed range, the upper limit DSRHLMT increases at a greater rate as the vehicle speed VSP increases. This is effective to ensure sufficient engine brake forces so as to decelerate the vehicle to an extent according to the vehicle speed VSP when the accelerator pedal is released in such a high vehicle speed range.

When the inhibitor switch 16 is operated to select the sport mode (Ds range), the target input shaft speed value DSRREV is prevented from being corrected (FIG. 2, point 108) and is restricted between the lower limit DSRDsLMT and the upper limit corresponding to the full-open throttle position TVO=8/8 (FIG. 12). When the vehicle is coasting with the accelerator pedal being released in the Ds range, the target input shaft speed value DSRREV is set at the lower limit DSRDsLMT. The lower limit DSRDsLMT is greater than the upper limit DSRHLMT set for the D range except for the very low vehicle speed range and smaller than the upper limit corresponding to the full-open throttle position TVO=8/8, when the shift lever is operated to make a change from the D range to the Ds range while the vehicle is coasting on a downhill slope with the accelerator pedal being released, thus, the target input shaft speed value DSRREV is prevented from being corrected and is held at the lower limit DSRDsLMT for any vehicle speed higher than the very low vehicle speed range. As a result, the target input shaft speed value DSRREV increases as indicated by the arrow B of FIG. 16. That is, the target input shaft speed value DSRREV increases to the point R2 on the lowe limit DSRDsLMT to produce a greater engine brake force so as to provide a good feel of vehicle deceleration according to the operator's intention when a change is made to the Ds range from the D range where the corrected target input shaft speed value DSRENBR is restricted at the point R1 while the vehicle is coasting on a downhill slope having a great gradient.

The operation of the continuously variable transmission control apparatus of the invention will be described. The correction of the target input shaft speed value DSRREV is initiated when the following conditions are fulfilled that is when the Ds range is not selected (FIG. 2, point 108), The vehicle acceleration TERAMS6 comes out of the uniform motion range (FIG. 13) into the accelerated or decelerated motion range (FIG. 6, points 168 and 172), and the accelerator pedal remains released (FIG. 7. point 190). When the vehicle acceleration comes into the accelerated or decelerated motion range set according to the vehicle speed VSP (FIG. 6, point 170 or 174) while the vehicle is coasting on a downhill slope with the accelerator pedal held released, the down-or up-shift Correction factor DDSRDN or DDSRUP calculated from the map of FIG. 15 (FIG. 7. points 180 and 182) is used to correct the corrected target input shaft speed DSRENBR (FIG. 8, points 214 and 226). This correction is repeated at uniform time intervals to change the engine brake force continuously and smoothly according to the gradient of the downhill slope so as to bring the vehicle acceleration into the uniform motion range (FIG. 13).

In order to suppress excessive engine brake application, the program proceeds to the points 260 et seq. When the corrected target input shaft speed DSRENBR exceeds the upper limit DSRHLMT calculated at the point 152, the upper limit DSRHLMT is set for the target input shaft speed DSRREV (points 268, 276 and 181) so as to realize the vehicle deceleration according to the operator's expectation.

Upon an increase in the gradient of the downhill slope on which the vehicle is coasting with the accelerator pedal held released, the vehicle acceleration tends to increase from the uniform motion range into the accelerated range since the target input shaft speed has been set until now for a gentler gradient of the downhill slope. In order to remove this tendency, it is required to increase the engine brake force by adding the downshift correction factor DDSRDN from the map of FIG. 15 to the last value of the corrected target input shaft speed value DSRENBR when the vehicle acceleration comes into the accelerated motion range. The corrected target input shaft speed DSRENBR is corrected by adding a downshift correction factor DDSRDN calculated according to the vehicle acceleration to the last value of the corrected target input shaft speed DSRENBR. This correction is repeated at uniform intervals of time (in the illustrated case 5 msec) to increase the target input shaft speed value DSRREV so as to increase the engine brake force continuously and smoothly according to the vehicle acceleration changes with no sense of incompatibility to the operator. As a result, the vehicle acceleration converges into the uniform motion range (FIG. 13) to provide a feel of deceleration according to the operator's expectation.

In order to avoid excessive engine brake in response to a sudden increase in the gradient of the downhill slope on which the vehicle is coasting with the D range, the corrected target input shaft speed DSRENBR is limited below the upper limit DSRHLMT set based on the vehicle speed VSP. This is effective to prevent an unnecessary vehicle deceleration feel to the operator. It is now assumed that the corrected target input shaft speed DSREN is set at a value indicated by the point $R_0$ of FIG. 16 while the vehicle is coasting with the D range on a downhill slope. Upon a sudden increase in the gradient of the downhill slope, the downshift correction factor DDSRDN increases to increase the corrected target input shaft speed DSRENBR. However, the corrected target input shaft speed DSRENBR is limited by the upper limit DSRHLMT and set at a value indicated by the point $R_1$ of FIG. 16. This is effective to avoid an necessary vehicle deceleration feel to the driver, and particularly in the low vehicle speed range, to suppress noise resulting from an excessive engine speed increase.

When the shift lever is changed to select the Ds range in order to increase the engine brake force further while the vehicle is coasting on a downhill slope with the D range, the correction of the target input shaft speed value is inhibited in the Ds range, the target input shaft speed value DSRREV will remain at the lower limit DSRDsLMT set for the Ds range if the accelerator pedal is released. Since the lower limit DSRDsLMT is greater than the upper limit DSRHLMT over the entire vehicle speed range, the target input shaft speed DSRREV increases in response to an operator's operation making a change from the D range, to the Ds range. As a result, the target input shaft speed limited at a value indicated by the point $R_1$ of FIG. 16 increases to a value indicated by the point $R_2$ of FIG. 16 on the lower limit DSRDsLMT so as to increase the engine brake force. It is, therefore, possible for the operator to certainly increase the engine brake force by making a change to the Ds range, for example, when the vehicle comes near a corner of the downhill slope on which the vehicle is coasting with the D range. If a change is made to the D range from this state, the correction of the target input shaft speed value will be resumed so that the corrected target input shaft speed value DSRENBR returns to the value indicated by the point $R_1$ of FIG. 16. The corrected target input shaft speed value DSRENBR will further change to the value indicated by the point $R_0$ of FIG. 16 if the gradient of the downhill slope decreases thereafter. This is effective to realize smooth vehicle coasting with a good response to an operator's driving operation and without any sense of incompatibility.

Although the invention has been described in connection with a shift lever to make a selection between the D and Ds ranges, it is to be understood that a speed change mode changeover switch may be provided for the same purpose.

What is claimed is:

1. An apparatus for controlling a continuously variable transmission for use with an automotive vehicle including an accelerator pedal, the transmission having an input and output shaft, the transmission being operable at a variable speed ratio for transmitting a drive from the input shaft to the output shaft comprising:

means for sensing vehicle operating conditions including vehicle acceleration and vehicle speed;

means for producing a released accelerator pedal indicative signal when the accelerator pedal is released;

means for calculating a target value for the speed of rotation of the input shaft based on the sensed vehicle operating conditions;

means for correcting the target input shaft speed value to bring the vehicle acceleration into a predetermined range in the presence of the released accelerator pedal indicative signal;

means for setting an upper limit for the target input shaft speed value based on the vehicle speed;

means for limiting the corrected target input shaft speed value below the upper limit; and means for controlling the speed ratio to bring the input shaft speed into coincidence with the corrected target input shaft speed value.

2. A continuously variable transmission control apparatus as claimed in claim 1, further including means for making a selection between first and second speed change modes, means for operating the continuously variable transmission in the first speed change mode for normal vehicle driving when the first speed change mode is selected; means for operating the continuously variable transmission in the second speed change mode to restrict the target input shaft speed below a lower limit set according to the vehicle speed so as to provide an increased engine brake force when the second speed change mode is selected in the presence of the released accelerator Pedal indicative signal; and means for preventing the correction of the target input shaft speed value when the second speed change mode is selected.

3. A continuously variable transmission control apparatus as claimed in claim 2, further including means for setting the lower limit at a value greater than the upper limit.

4. A continuously variable transmission control apparatus as claimed in claim 1, wherein the means for correcting the target input shaft speed value includes means for increasing the target input shaft speed value when the vehicle acceleration exceeds a threshold value determined according to the vehicle speed.

*5. An apparatus for controlling a continuously variable transmission for use with an automotive vehicle including an accelerator pedal, the transmission having input and output shafts, the transmission being operable at a variable speed ratio for transmitting a drive from the input shaft to the output shaft, comprising:*

*means for sensing vehicle operating conditions including a vehicle speed;*

*means for calculating a target value for the speed of rotation of the input shaft based on the sensed vehicle operating conditions;*

*means for producing a released accelerator pedal indicative signal when the accelerator pedal is released;*

*means for determining a vehicle acceleration;*

*means for correcting the target input shaft speed value to bring the vehicle acceleration into a predetermined range in the presence of the released accelerator pedal indicative signal;*

*means for setting an upper limit for the target input shaft speed value;*

*means for controlling the speed ratio to bring the input shaft speed into coincidence with the corrected target shaft speed value; and*

*means for limiting the corrected target input shaft speed value below the upper limit.*

*6. A continuously variable transmission control apparatus as claimed in claim 5, wherein the upper limit increases with the increase of the vehicle speed.*

*7. A continuously variable transmission control apparatus as claimed in claim 5, further including means, responsive to a driver's manual operation, for operating the continuously variable transmission in a mode to restrict the target input shaft speed above a lower limit set according to vehicle speed in the presence of the released accelerator pedal indicative signal; and means for preventing the correction of the target input shaft speed value when the mode is selected.*

*8. A continuously variable transmission control apparatus as claimed in claim 6, further including means for setting the lower limit at a value greater than the upper limit.*

*9. A continuously variable transmission control apparatus as claimed in claim 5, wherein the means for correcting the target input shaft speed value includes means for increasing the target input shaft speed value when the vehicle acceleration exceeds a threshold value determined according to the vehicle speed.*

* * * * *